Nov. 30, 1937.  F. H. SCANTLEBURY  2,100,875
ILLUMINATED MEASURING DEVICE
Filed July 18, 1935
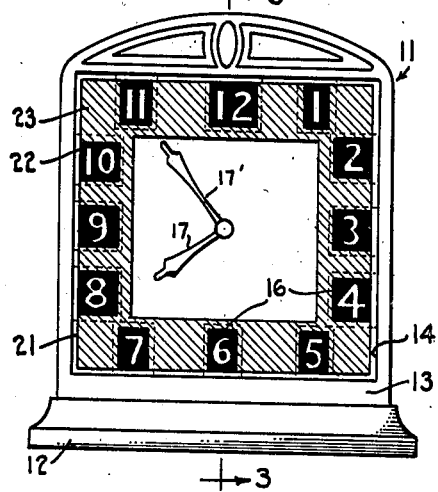
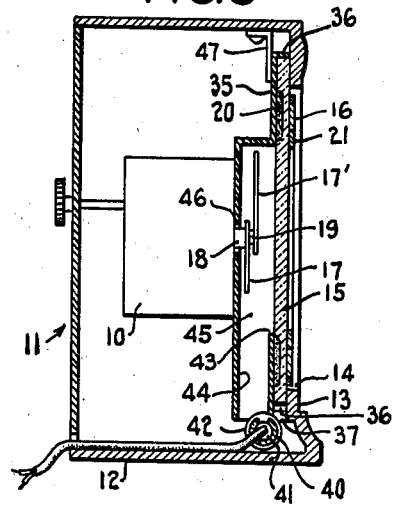
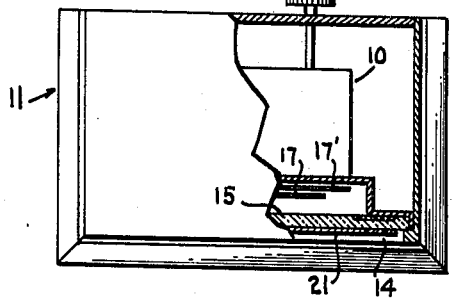
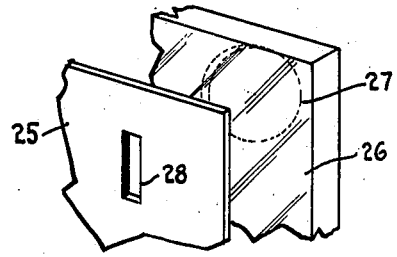
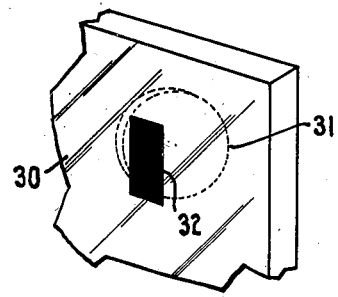
INVENTOR.
Francis H. Scantlebury
BY
ATTORNEY.

Patented Nov. 30, 1937

2,100,875

UNITED STATES PATENT OFFICE 2,100,875

ILLUMINATED MEASURING DEVICE

Francis H. Scantlebury, Brooklyn, N. Y.

Application July 18, 1935, Serial No. 32,069

3 Claims. (Cl. 240—2.1)

The invention relates to illuminated devices, as of the back-lighted type and in which suitable configurations or indicia are associated with an element of transparent glass or other transparent or translucent or perforated opaque material, adapted for individual illumination of the configurations and at least a part of which configurations is adapted for association with an element caused to move relatively thereto. The said configurations, for example, may be applied to one surface of a glass plate, and in which case they are illuminated by refracted light entering one or more edges of the glass; or, the configurations may be otherwise provided, as in being cut through an opaque plate, with the light directed therethrough from the rear of said plate.

The invention, for example, may embody illuminated time pieces, measuring apparatus, etc., and is especially adaptable to synchronous electric motor operated time pieces wherein the power for effecting the operation of the time piece may also serve to provide the desired illumination.

The present application is a continuation in part of U. S. Letters Patent No. 2,009,210, granted me the 23rd day of July, 1935.

The invention has for an object to effectively associate illuminated configurations of a dial or like plate with a movable member or members and in a manner such that the latter will also be clearly visible when the dial member is illuminated, making the device particularly suitable for use in darkened surroundings, as well as in daylight when the device is not illuminated.

A further object of the invention resides in a simple and inexpensive construction which may readily be adapted, for example, to time pieces of standard construction, and particularly to electrically operated time pieces.

In carrying out the invention, one or more members of transparent or translucent or perforated opaque, material serves to close in whole or in part the front of a suitable case or cabinet for housing the driving mechanism of the movable member or members to be associated with suitable configurations or divisions provided upon said plate or plates constituting the dial. Provision is made for illuminating these configurations from the rear as, for example, by individualized luminous fields, which are adapted to direct light without glare through or about the configurations, so that only the said configurations of a plate will be illuminated. At the same time proper illumination is transmitted to the associated background and/or the movable member or members designed to move over said background and in cooperative relation to the said configurations.

Such a background may be afforded, for example, by a plate portion or member which may be sufficiently displaced in any suitable manner from the inner face of the plate or plates to afford a compartment for accommodating the movable element or elements; and a shaft or arbor for moving the same is then arranged to project through the background member.

Provision is also made, as through a lamp or lamps located in the case, whereby to illuminate simultaneously solely the individual configurations as well as the background and/or the moving element which will then be provided in contrasting colors or preferably as a light and a dark element respectively, so that the said movable element or elements will be prominently displayed against the illuminated background and will always be clearly visible through the configuration-bearing plate which, if opaque, will be centrally cut out over the said background portion.

Furthermore, the background member may be so constructed as to retain also the plate elements and lamp, if desired, and will afford thus a compact unit for association with the driving mechanism, both unit and mechanism being located within the case or cabinet housing said driving mechanism for the movable member or members.

The nature of the invention, however, will best be understood when described in connection with the accompanying drawing, in which:

Fig. 1 is a front elevation of the novel illuminated device as embodied in a clock.

Fig. 2 is a plan thereof with part of the cover broken away to disclose the interior, a portion of which is shown in horizontal section.

Fig. 3 is a vertical section through the device and taken on the line 3—3, Fig. 1.

Figs. 4 and 5 are fragmentary perspective views illustrating modifications.

Referring to the drawing, the invention is illustrated as embodied in a time piece, more particularly of the synchronous electric motor operated type, although the invention is not to be understood as being restricted to clocks of this type, as the ordinary spring-operated clock may also be employed, particularly where alternating current is not available. Also, the invention is applicable to other measuring apparatus embodying a scale or the like and a member movable in relation thereto.

The entire mechanism, including the motor 10, is shown as housed within a suitable cabinet or the like 11 mounted upon a base 12. The front wall 13 of the cabinet is provided with an aperture 14 to expose the face of the dial of the clock, said opening in the present instance being square, but, of course, the particular design of the opening may be varied as desired.

Through this aperture 14 is visible a dial plate 15 carrying the desired design or configurations such as the time subdivisions or numerals 16 and any other ornamentation or the like as may be desired. Through the central portion of this dial and the apertures 14 are also visible the hands 17 and 17' of the clock, the same being mounted upon arbors 18 and 19 driven from the clock motor 10 in the usual manner.

In the present embodiment, the dial 15 is in the nature of a transparent plate of glass which serves to close the front portion of the housing; and there is etched as by sand-blasting or the like, and as is more particularly set forth in my prior U. S. Letters Patent #1,707,965, granted to me the 2nd day of April, 1929, a plurality of light-refracting field portions 20, in the present instance of rectangular conformation. These are distributed over the back of the plate to afford from the rear luminous individual fields for illuminating without glare the configurations or indicia 16 which are located upon the opposite or outer face of the plate in registery with the respective fields. The configuration 16 may be variously applied, for example, as upon a decalcomania film 21 and may be transparent, translucent or even opaque. As shown in Fig. 1, the configurations 16 are substantially transparent to transmit the maximum illumination from the fields 20 and are surrounded by an opaque body 22 which in turn is enclosed by a colored translucent field 23, presenting a pleasing outline for the configurations.

Or, in place of the decalcomania film a stencil sheet 25, Fig. 4, of opaque material may be placed in front of the dial plate 26 provided over its back surface with the light-refracting portions 27, the stencil portion 28 affording the configurations then registering with the respective fields which, when illuminated, as hereinbefore set forth, will cause only the stencil portions 28 to appear illuminated. If desired, the glass surface outlined by the said stencil portions may be colored with a transparent or translucent lacquer or the like to set forth the configurations in any desired color.

A further modification in the configurations is indicated in Fig. 5 of the drawing wherein the glass plate 30, similarly provided with light-refracting portions 31 over its back surface, has the configurations 32 printed directly upon its opposite face to register with the said light-refracting or field portions 31, said configurations which are generally opaque then standing out against an illuminated field.

In the construction of the complete device, the central portion of configuration-bearing plate as the plate 15, Figs. 1 to 3, is free of configurations and remains clear to render visible therethrough the hands 17 and 17' which are arranged in cooperative relation to the said configurations which, in the present embodiment, represent the hour subdivisions 16 only of the clock, no minute subdivisions being indicated.

In order that the hands of the clock may be clearly visible at all times, particularly in darkened surroundings, an illuminable background member or field is to be associated therewith, the same being provided, for example, by a frame member embodying the forward wall 35 of opaque material and serving as a backing for the outer portion of the plate 15 and its configurations. This plate may also be retained by the frame as through the provision of suitable flanges 36 directed outwardly from its corresponding edges, the flange directed from the bottom edge affording a vertical support for the said plate.

Furthermore, a clamp 40 may extend backwardly from the lower edge to afford a support for the lamp socket 41 carrying the illuminating element or electric lamp 42. This lamp, of course, must be located suitably with reference to one of the edges of the plate 15 in order that light may be directed therethrough to provide for back-lighting of the configurations thereon, and in the present embodiment it is shown as located beneath the lower edge of the plate.

The frame member is also extended backwardly from an aperture 43 therein which is coaxial with the aperture 14 of the housing and registers with the central clear portion of plate 15. A box-like extension is thereby afforded of which the background wall 44 is displaced from the forward border portion 35 of the frame member as well as from the plate 15 carried thereby, said plate and background wall thus forming therebetween a light chamber 45 within which the hands 17 and 17' may operate. An opening 46 is provided also in this background wall portion to pass the arbors 18 and 19 of the clock mechanism for moving the said hands.

This frame member thus affords a very convenient one-piece support for the said plate 15 as well as the lamp 42 and may be held to the housing, for example, the top thereof, as by means of an attaching lug 47 which may be screwed to said housing top, the lips 36 resting upon supports 37 extending backwardly from the lower portion of the cabinet 11.

A wall of the box-like extension is cut away or preferably left entirely open, as indicated in Fig. 3 of the drawing, so that rays of light from the lamp 42 will also be directed upwardly into the chamber 45 simultaneously with the illumination of the light-refracting fields for the configurations of plate 15. By directing light into the chamber 45, the forward face of the background member 44 as well as the hands 17, 17' will be illuminated by the light cast thereon; and if this face be provided in a color contrasting with the color of the hands 17 and 17' of the clock, the latter will stand out distinctly with reference to the field provided by the background member and thus will be visible at all times. For example, the face of the background member may be white or of a light color while the hands are black or of a dark color.

A very effective type of clock device results from this combination of the time subdivisions 16 in any desired color, each subdivision being individually set out against an illuminated background or field, and juxtaposed with respect to the hands 17 and 17' which stand out prominently against the backgroud 44.

I claim:

1. An illuminated measuring device, comprising a light-transmitting plate bearing configurations spaced over its outer face and having intermediate clear spaces, and individual separated light-refracting portions on its opposite face with opaque backing, said portions being located directly behind the corresponding configurations to afford individual illuminated fields for the respective configurations, an element movable in cooperative relation to the configurations and forming therewith a visible ensemble, and a source of light invisible from the front of the device and so located therein that part of the light rays therefrom pass into the configuration-bearing plate through an edge thereof to edge-illuminate the light-refracting field portions and from these the respective configurations, while other rays serve to illuminate the movable element.

2. An illuminated measuring device, comprising a transparent plate bearing configurations spaced over its outer face and having intermediate clear spaces, and individual separated etched portions in its opposite face with opaque backing, said portions being located directly behind the corresponding configurations to afford individual illuminated fields for the respective configurations, an element movable in cooperative relation to the configurations and forming therewith a visible ensemble, and a source of light invisible from the front of the device and so located therein that part of the light rays therefrom pass into the configuration-bearing plate through an edge thereto to edge-illuminate the light-refracting field portions and from these the respective configurations, while other rays serve to illuminate the movable element.

3. An illuminated measuring device, comprising a transparent plate bearing light-transmitting configurations spaced over its outer face and having intermediate clear spaces, and individual, separated light-refracting portions in its opposite face with opaque backing, said portions being located directly behind the corresponding configurations to afford individual illuminated fields for the respective configurations, an element movable in cooperative relation to the configurations and forming therewith a visible ensemble, and a source of light invisible from the front of the device and so located therein that part of the light rays therefrom pass into the configuration-bearing plate through an edge thereof to edge-illuminate the light-refracting field portions and from these the respective configurations, while other rays serve to illuminate the movable element.

FRANCIS H. SCANTLEBURY.